(No Model.)
H. KAGANOVSKY.
FOLDING HORSE.
No. 598,100. Patented Feb. 1, 1898.
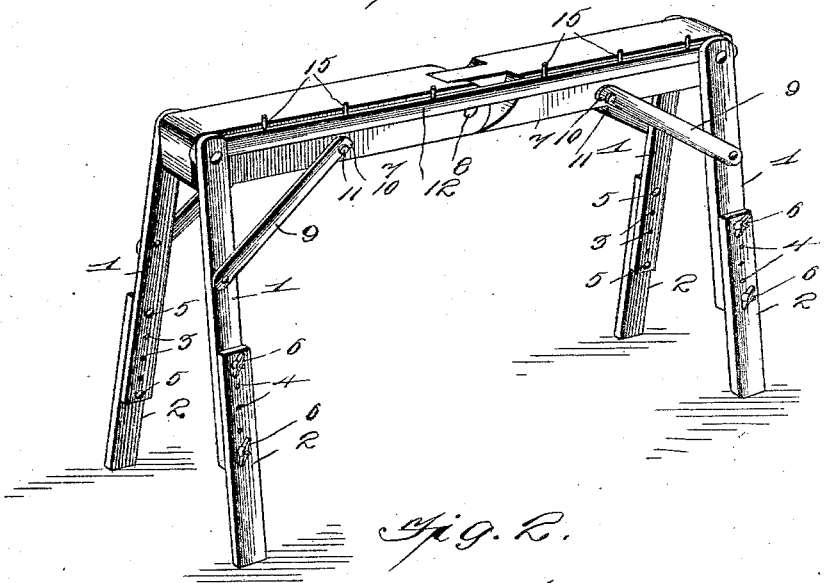
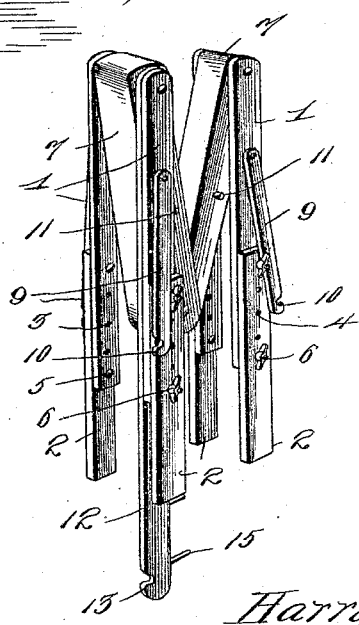
Witnesses
Inventor
Harry Kaganovsky,
by John Wedderburn
Attorney

UNITED STATES PATENT OFFICE.

HARRY KAGANOVSKY, OF BIDDEFORD, MAINE.

FOLDING HORSE.

SPECIFICATION forming part of Letters Patent No. 598,100, dated February 1, 1898.

Application filed May 5, 1897. Serial No. 635,237. (No model.)

*To all whom it may concern:*

Be it known that I, HARRY KAGANOVSKY, of Biddeford, in the county of York and State of Maine, have invented certain new and useful Improvements in Folding Horses; and I do hereby declare the following to be a full, clear, and exact description of the invention, such as will enable others skilled in the art to which it appertains to make and use the same.

My invention relates to carpenters' horses, and has for its object to provide an improved horse suitable for builders and carpenters which may be folded into a small compass and readily transported from one place to another.

My invention consists in certain novel features of construction hereinafter shown and described.

In the accompanying drawings, Figure 1 is a perspective view of the horse set up, and Fig. 2 is a similar view in its folded position.

The numeral 1 indicates the legs of the horse, which are provided with adjustable extensions 2. A series of openings 3 are formed in each of the legs, and similar openings 4 are formed in the extensions thereof. Bolts 5, provided with nuts 6, preferably butterfly-nuts, serve to hold said legs and said extensions together. Bars 7 are pivoted to the upper end of each pair of said legs and are pivotally joined, as at 8. Braces 9, provided with hooked ends 10, are pivoted to the legs and adapted to hook lugs 11 on the bars 7 when the horse is set up. An extension-bar 12, provided with a hook 13, is pivoted to one pair of the legs and is adapted to connect with the other pair by means of the hook and keep the upper ends of the said legs in an extended position. Lugs 15 are provided upon the upper side of this extension-bar for the purpose of holding planks which may be laid thereon in position.

In operation it is simply necessary to adjust the legs to the proper height by means of the bolts and butterfly-nuts, spread them apart, hook the extension-bar, and hook the braces. The reverse operation folds the horse, when it may be readily transported from one place to another.

Having thus described my invention, what I claim as new, and desire to secure by Letters Patent, is—

1. In a carpenter's horse, the combination with extensible legs, of jointed bars connecting said legs, an extension jointed bar pivotally connected at its ends to the upper ends of said legs to hold the upper ends of said legs apart, a brace adapted to secure said legs in their open position, substantially as described.

2. In a carpenter's horse, the combination with legs provided with a series of openings therein, of extensions thereon provided with a similar series of openings, bolts adapted to secure said extensions to said legs, jointed bars each pivoted to one pair of said legs and pivotally connected, lugs on said bars, braces pivoted to said legs and adapted to engage said lugs, an extension-bar pivoted to one pair of said legs and provided with a hook adapted to engage the opposing pair, and lugs upon said bar, as and for the purpose set forth.

In testimony whereof I have signed this specification in the presence of two subscribing witnesses.

HARRY KAGANOVSKY.

Witnesses:
LEROY HALEY,
W. W. MCINTYRE.